United States Patent [19]

Kuze

[11] Patent Number: 4,658,347
[45] Date of Patent: Apr. 14, 1987

[54] READ-ONLY SEQUENCE CONTROLLER

[76] Inventor: Yoshikazu Kuze, 31-3, Higashimagome 1-chome, Ohta-ku, Tokyo, Japan

[21] Appl. No.: 691,085

[22] Filed: Jan. 14, 1985

[51] Int. Cl.⁴ ............................................. G06F 15/46
[52] U.S. Cl. ..................................... 364/140; 364/143; 364/147
[58] Field of Search .............................. 364/140–147, 364/200 MS File, 900 MS File, 167, 171, 188–189; 340/825.79, 825.80, 825.83

[56] References Cited

U.S. PATENT DOCUMENTS

| | | | |
|---|---|---|---|
| 3,875,564 | 4/1975 | Thuruoka et al. | 364/200 X |
| 4,253,141 | 2/1981 | Suzuki et al. | 364/147 X |
| 4,409,649 | 10/1983 | Heeger | 364/144 |
| 4,432,047 | 2/1984 | Okayama | 364/147 |
| 4,486,832 | 12/1984 | Haubner et al. | 364/200 |
| 4,504,900 | 3/1985 | Yomogida et al. | 364/140 |
| 4,542,452 | 9/1985 | Fukai et al. | 364/141 |
| 4,567,556 | 1/1986 | Onogi et al. | 364/140 |

*Primary Examiner*—Gary V. Harkcom
*Attorney, Agent, or Firm*—Birch, Stewart, Kolasch & Birch

[57] ABSTRACT

A read-only sequence controller comprises a control unit and an output relay unit detachably attached to the control unit and having an erasable programmable read only memory or EPROM and a plurality of relays responsive to data output of the EPROM for controlling a machine. The control unit produces outputs for addressing the EPROM for operating the machine.

7 Claims, 4 Drawing Figures

READ-ONLY SEQUENCE CONTROLLER

BACKGROUND OF THE INVENTION

The present invention relates to a read-only sequence controller, and more particularly to a sequence controller having a control unit with an output relay unit detachably attached thereto.

A conventional sequence controller has a source unit, sequential control unit, and output relay unit responsive to output signals of the control unit for producing output signals for sequentially operating machines. These units are arranged side by side so that the area of the sequence controller becomes very large. Accordingly, such a controller is not suitable to be attached to a machine to be controlled.

SUMMARY OF THE INVENTION

An object of the present invention is to provide a read-only sequence controller which is compact in size so as to be easily attached to a machine.

It is another object of the present invention to provide a read-only sequence controller in which an output relay unit is detachably fixed to a control unit.

A further object of the present invention is to provide a read-only sequence controller which is capable of being connected with other read-only sequence controllers through sensors in series or in parallel.

It is a further object of the present invention to provide a read-only sequence controller having prior operation ensuring gate means and gate means for continuous operation.

The read-only sequence controller of the present invention comprises a control unit provided with a source, and an output relay unit having a plurality of relays mounted on a board and detachably mounted on the control unit. A standard output relay unit is provided with eight output relays. A pair of output relay units may be attached to both sides of the control unit so that sixteen output relays can be provided. Thus, the sequence controller is compact in size.

According to the present invention, the control unit having a source is provided with input terminal units for applying address pulse frequencies which correspond to preset values of the output relay unit.

The output relay unit is provided with an erasable programmable read-only memory, or EPROM, a relay unit, and output terminal units on a printed board. A machine, such as a press or cutting machine, is operated in accordance with the data of the EPROM and stopped at the end of one cycle. If there is no abnormality, the operation is repeatedly continued by a signal from an external sensor provided in the machine. Since the operation stops at the end of every cycle, the completion of the operation can be confirmed.

If there is any abnormality in the operation, the machine is immediately stopped by an abnormality signal dependent on a signal from the machine. After the inspection and repair of the machine, a start switch is turned on. In order to restart the operation from a state when the machine is stopped, continuous starting gate means is provided.

Further, a prior operation ensuring gate means is provided for invalidating other starting input signals applied during operation.

These and other objects and features of the present invention will become more apparent from the following description with reference to the accompanying drawings.

DESCRIPTION OF THE PREFERRED EMBODIMENTS

Figure 1:
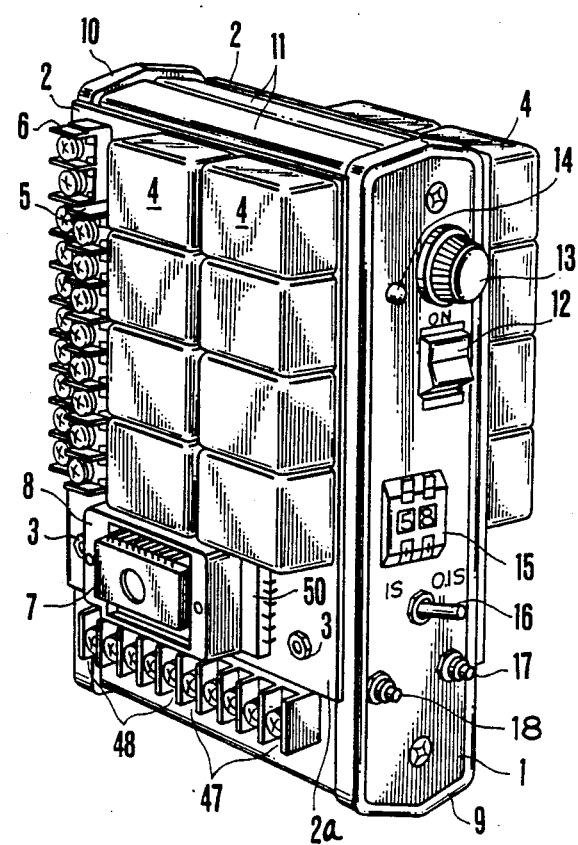
FIG. 1 is a perspective view of a read-only sequence controller having sixteen output relays according to the present invention.

Referring to FIG. 1, a read-only sequence controller of the present invention comprises a control unit provided in a case 1 and a pair of output relay units 2 provided on both sides of the control unit case 1. The control unit case 1 comprises panel plates 9 and 10 and a pair of covers 11 made of metal plate. A preset code switch 15 attached to the panel plate 9 displays digits of two figures for one cycle time. Numeral 16 is a cycle time select switch.

The preset code switch 15 and the select switch 16 are operated to select a necessary cycle time. If the select switch 16 is set to 0.1, digits "58" shown in FIG. 1 means that a cycle time of 5.8 seconds is provided. If the select switch is set to 1, the cycle time is 58 seconds. The digits of two figures of the preset code switch can be changed from "0.1" to "99".

Numeral 13 is a fuse, and 12 is a power switch. A pilot lamp 14 is provided to emit light when the power switch is turned on. A stop switch 18 is provided to stop a machine to be controlled during the operation, and a start switch 17 is provided to start the operation. An input terminal unit comprising starting input terminals 47 and stop input terminals 48 is provided on the lower portion of the cover 11.

Each of the output relay units 2 comprises a board 2a detachably secured to the upper portion of the input terminal unit of the cover 11 by screws 3. Relays 4 constructed with eight relays are mounted on the board 2a. Terminal units 5 and 6 are disposed adjacent to the relay unit 4. The terminal unit 5 has eight terminals for four relays and the terminal unit 6 has ten terminals for the other four relays and for an alternating current power supply. On the other hand, terminal units provided on the other side comprise sixteen terminals without terminals for power supply. An EPROM 7 is detachably fixed to a connector 8. By address signals from the control unit 1, the EPROM 7 is addressed to produce data signals in parallel so that the machine is controlled by the signals through the corresponding relays 4 and terminals. An inverter buffer 50 is disposed adjacent to the connector 8.

Figure 2:
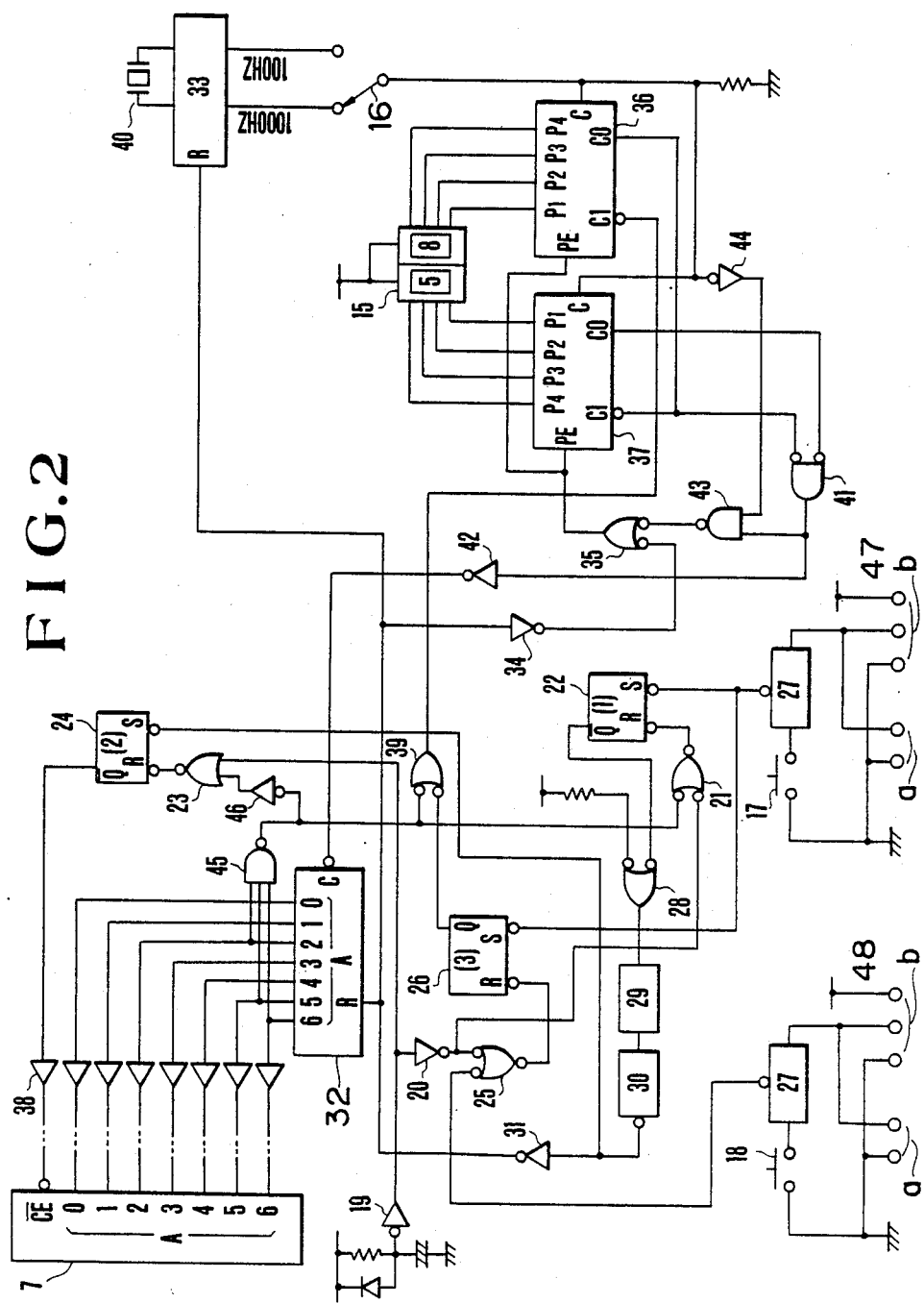
FIG. 2 shows a circuit of a control unit of the present invention.

Referring to FIG. 2, a system supply voltage is applied to an initial reset circuit 19 to reset each of a number of flip-flops. When the supply voltage is applied, a first flip-flop 22 is reset through an inverter 20 and a 2-input AND gate 21, a second flip-flop 24 is reset through a 2-input NOR gate 23, and a third flip-flop 26 through the inverter 20 and a 2-input AND gate 25.

The cycle time is set by the preset code switch 15 and the select switch 16, and then the start switch 17 is depressed. The first flip-flop 22 and the third flip-flop 26 are set respectively through chattering preventing circuit 27. An output Q of "0" from the first flip-flop 22 is applied to a 2-input NAND gate 28. By the output "1" from the gate 28, a one-shot pulse "0" appears at the output of a one-shot pulse generating circuit 30 through a delay circuit 29. This signal is inverted through an inverter 31 to a one-shot pulse "1". This one-shot pulse "1" is applied A. to a reset R of a binary counter 32 to reset it to the zero state, B. to a reset R of a clock pulse generating circuit 33 comprising a frequency dividing circuit to reset it to the zero state, and C. to inputs PE of presettable down counters 36 and 37 through an inverters 34 and a 2-input NAND gate 35 to preset the digit "58" of preset code switch 15 in counters 36 and 37, respectively.

Further, the one-shot pulse "0" enters in the set S of the second flip-flop 24, the output $\overline{Q}$ "0" thereof is applied to the $\overline{CE}$ of the EPROM 7 of the output relay unit 2 through one of buffers 38 and the EPROM turns to the selection state. The third flip-flop 26 is set at the depression of the start switch 17 to produce an output Q "1" which is applied to the 2-input NAND gate 39. Then a "0" is applied to the C1 of the presettable down counter 36 so that the presettable down counter 36 operates to produce an output having two logic levels until a one cycle end signal or a stop signal is applied.

The output of a crystal oscillator 40 is divided by the clock pulse generating circuit 33 into 1000 Hz and 100 Hz, as clock pulses. One of these clock pulses is selected by a select switch 16.

The clock pulses are applied to clock lines C of the presettable down counters 36 and 37 respectively through the select switch 16. Preset lines P1, P2, P3 and P4 of the presettable counters are connected to BCD lines of preset code switch 15. Hereinafter it is assumed that the presettable down counters are called presettable counters.

Each time one clock pulse is applied to the presettable counter 36, the preset count therein decreases by one. When the count goes to zero, the upper figure of the counter 37 is changed from "5" to "4" and the lower figure is changed to "9". When 58 clock pulses are applied to the presettable counters, both inputs of a 2-input NOR gate 41 go to a "0". Thus, the 2-input NOR gate produces on read clock pulse which is applied to the clock line C of the binary counter 32 through an inverter 42. Accordingly, the binary counter 32 produces outputs through address lines A0, A1 . . . A6, so that the outputs are applied to the address in the EPROM 7 after being amplified by the buffer 38.

On the other hand, the output of the 2-input NOR gate 41 causes a 2-input NAND gate 43 to produce "0" when an inverter 44 produces output "1" by a negative going clock input. Thus, each presettable counter is preset through the 2-input NAND gate 35. At the same time, the "58" of the preset code switch is preset again in the presettable counters.

Thereafter, every time 58 clock pulses are applied to presettable counters, one read clock pulse is generated.

Time of one cycle is decided by the number of read clock pulses. Operation in the case of 100 read clock pulses in one cycle will be explained hereinafter.

In order to produce the one-cycle end signal upon 100 read clock pulses, address lines A2, A5 and A6 of the binary counter 32 are selected as the inputs of a 3-input NAND gate 45. Since the binary number of "100" is 1100100, when the 100 read clock pulses are applied to the input of the binary counter 32, outputs on the address lines A2, A5 and A6 go to "1" and the 3-input NAND gate 45 produces a one-cycle end signal "0". The one-cycle end signal causes:

A. The first flip-flop 22 being reset through the 2-input AND gate 21.

B. A "1" being applied through a 2-input NAND gate 39 to the CIN line of the presettable counter 36 to stop counting.

C. A "0" being applied to a reset of the second flip-flop 24 through a 2-input NOR gate 23 and an inverter 46, so that the output $\overline{Q}$ "1" is applied to the $\overline{CE}$ of the EPROM 7 of the read-only sequence controller to turn the EPROM to the non-selection state.

Therefore, the presettable counter 36 stops counting and the EPROM stops producing the output, so that the machine to be controlled by this system stops after 5.8 seconds of operation.

When it is necessary to interrupt the operation, the stop switch 18 is depressed, so that the third flip-flop 26 is reset through the circuit 27 and 2-input AND gate 25. A "0" of the output Q is applied to the 2-input NAND gate 39 to produce an output "1" which enters into the C1 of the presettable counter 36. Thus, the output of the clock pulse stops and the machine stops.

Starting input terminals 47 comprises first terminals a for contact sensors and second terminals b for contactless sensors. If a starting signal from one of sensors in the machine enters into the terminals at the end of one cycle, the signal causes the same result as depressing the start switch 17. Thus, the first, second and third flip-flops are set and the operation is started and stopped at one cycle end.

The operation is kept, even if any other signals are applied to the input terminals, since the output of the circuits 27 is invalidated by the first flip-flop 22. If the flip-flop 22 is not provided, all circuits are cleared by an input signal so that the operation returns to a starting state, which will cause the breakdown of the machine or products.

Further, stop input terminals 48 comprise cantact sensor terminals a and contactless sensor terminals b. If an abnormality signal enters into the stop input terminals, the signal causes the same result as depressing the stop switch 18. That is, the machine stops by reset of the third flip-flop 26.

Under the hold condition by the third flip-flop 26, inspection and repair of the machine may be safely done. If the start switch 17 is depressed after inspection and repair, the third flip-flop 26 is set instead of the first flip-flop 22. Thus, the presettable counters 36, 37 restart counting and the machine restarts from the state when stopped.

The above-mentioned are summarized as follows;

A. By the supply voltage, the first flip-flop 22, the second flip-flop 24 and the third flip-flop 26 are reset, respectively.

B. The start switch 17 is depressed, the first flip-flop 22, second flip-flop 24 and third flip-flop 26 are set to start the machine operation.

C. By the one cycle end signal, the first flip-flop 22 and second flip-flop 24 are reset and the machine stops.

D. At that time, by the external starting input signal from one of sensors in the machine, the first flip-flop 22, second flip-flop 24 and third flip-flop 26 are set and the machine is started to repeat the manufacturing process.

E. By the stop input signal or external abnormality input signal, the machine is interrupted. The machine is restarted from the previous stopped state.

F. During the operation, all starting input signals other than the initial starting input signal are invalidated.

The controllers can be connected in series and in parallel by interposing sensors between controllers. The sensor is provided for confirming the quality of the product by the previous controller and for producing a signal to start the subsequent controller. Controllers can be operated in parallel, if the output of the sensor is applied to the subsequent controller at a time during the operation of the previous controller.

Figure 3:
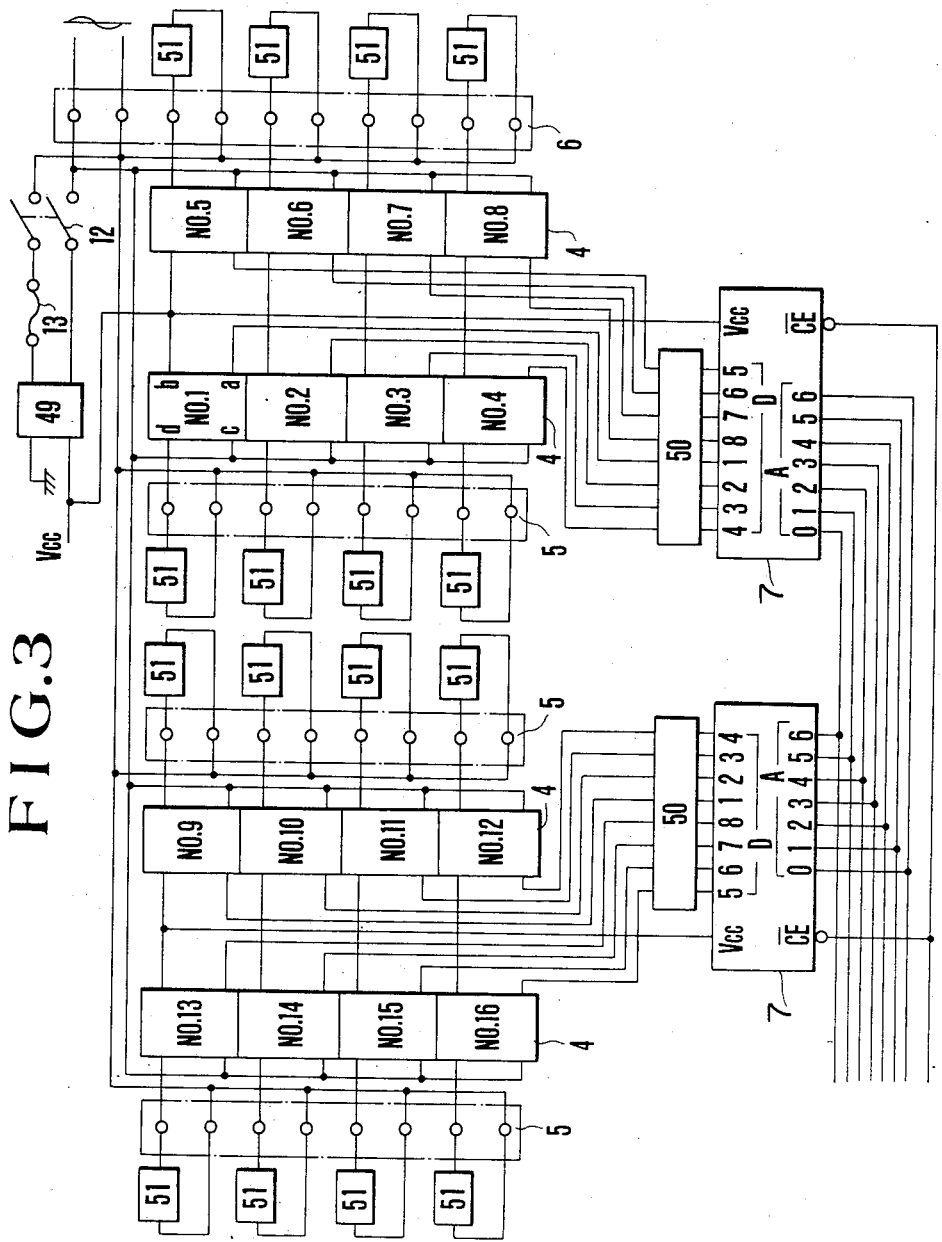
FIG. 3 shows a circuit of an output relay unit of the present invention.

Referring to FIG. 3, a system supply voltage $V_{CC}$ is obtained by an AC/DC converter 49 and a supply voltage +25 V applied to a $V_{pp}$ of the EPROM 7 is obtained by a DC/DC converter by setting up the $V_{CC}$.

When the start switch 17 of the control unit is depressed, the second flip-flop 24 is set and the signal "0" is applied to $\overline{CE}$ of the EPROM 7 so that the EPROM is changed to the selection state. Then, address pulses in synchronism with read clock pulses are applied to address lines A0, A1 . . . A6 of the EPROM 7, so that data in the EPROM are produced from data outputs D1, D2 . . . D8 in parallel.

Since driving circuits for sixteen output relays 4 are of the same construction, an explanation of only the driving circuit for the No. 1 output relay will be made hereinafter.

The signal "1" appeared on the output D1 in the EPROM 7 is inverted to "0" by an inverter buffer 50. The current flows from $V_{CC}$ between inputs b and a so that the relay 4 is turned on to drive a load 51. When the output of the output D1 goes to "0", the relay 4 turns off so that driving of the load stops.

Figure 4:
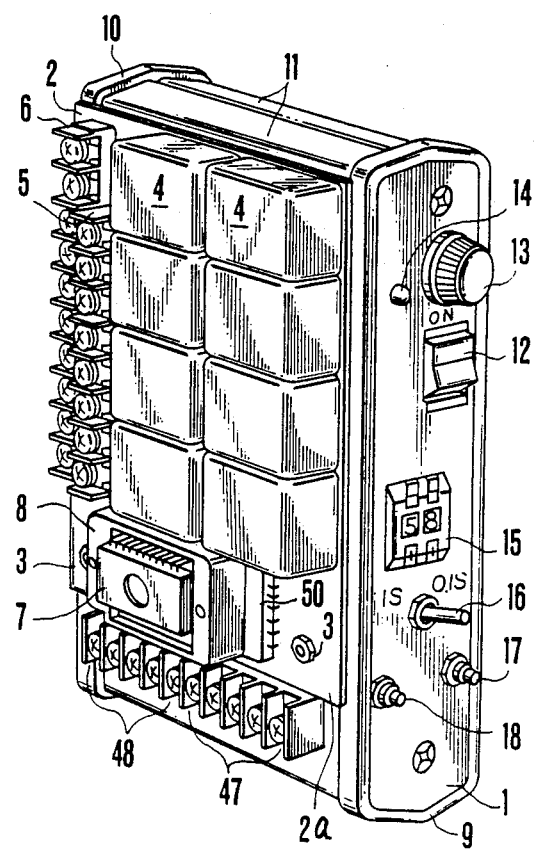
FIG. 4 is a perspective view of another embodiment of the present invention having eight output relays.

FIG. 4 shows another embodiment of the read-only sequence controller of the present invention in which eight outputs are provided.

While the invention has been described in conjunction with preferred specific embodiments thereof, it will be understood that this description is intended to illustrate and not limit the scope of the invention, which is defined by the following claims.

What is claimed is:

1. A read-only sequence controller for controlling the operation of a machine, comprising:
   a case;
   a control unit provided within said case;
   a circuit board detachably mounted on said case;
   an output relay unit provided on said board, including,
      an EPROM detachably mounted on said board,
      a plurality of relays responsive to data outputs of said EPROM for respectively producing driving signals, and
      a plurality of output terminals for coupling said driving signals to said machine; the control unit including,
         clock pulse generating means for producing clock pulses,
         presettable counter means for counting said clock pulses and producing a read clock pulse after a predetermined number of clock pulses has been counted,
         binary counter means for counting said read clock pulses and producing a sequential output for addressing said EPROM in response to each read clock pulse so counted, said EPROM being responsive to said sequential output for activating a predetermined relay,
         means, responsive to a predetermined sequential output from said binary counter means, for resetting said presettable counter means and said binary counter means and stopping the operation of the machine by setting said EPROM in a non-select state, and
         means responsive to a normal condition of said machine, for setting said presettable counter means and said binary counter means and restarting the operation of the machine.

2. A read-only sequence controller for controlling the operation of a machine, comprising:
   a case;
   a control unit provided in the case;
   a circuit board detachably mounted on the case;
   an output relay unit provided on the board,
   said output relay unit including an EPROM detachably mounted on the board, a plurality of relays responsive to data outputs of the EPROM for respectively producing driving signals, and a plurality of output terminals for coupling said driving signals to said machine;
   the control unit including,
      a clock pulse generating circuit for producing clock pulses,
      a presettable counter for counting the clock pulses and for producing a read clock pulse at every preset count,
      a binary counter for counting the read clock pulse and for producing outputs for addressing the EPROM, so that the EPROM produces data outputs for turning on the relays, and
      a control circuit for controlling the start and stop operations of the counters.

3. The read-only sequence controller according to claim 2, wherein the control circuit comprises:
   a start signal circuit having a start switch;
   a stop signal circuit having a stop switch;
   a first circuit including gate circuits responsive to a signal from the start signal circuit for starting the presettable counter and the binary counter; and
   a second circuit including gate circuits responsive to a signal from the stop signal circuit for stopping the counters.

4. The read-only sequence controller according to claim 3 wherein the start signal circuit has input terminals for receiving a start signal from an outside device, and the stop signal circuit has input terminals for receiving a stop signal from an outside device.

5. The read-only sequence controller according to claim 3 wherein the gate circuits comprise gates responsive to a predetermined signal from the binary counter for producing a one-cycle end signal to stop the operation of the controlled machine.

6. The read-only sequence controller according to claim 5 wherein the first circuit has a first flip-flop adapted to be set by the signal from the start signal circuit for starting the counters and reset by the one-cycle end signal for stopping the counters.

7. The read-only sequence controller according to claim 5 wherein the second circuit has a second flip-flop adapted to be reset by the signal from the stop signal circuit and set by the signal from the start signal circuit for the start of the operation.

* * * * *